United States Patent [19]

Meguro et al.

[11] 3,875,196

[45] Apr. 1, 1975

[54] PROCESS FOR PREPARING PHOSPHORIC ACID ESTERS OF FATTY ACID MONO- OR DI-GLYCERIDES

[75] Inventors: Takashi Meguro, Zushi; Hironori Takashashi, Kawasaki; Kazuko Arai, Tokyo, all of Japan

[73] Assignee: Ajinomoto Co., Inc., Tokyo, Japan

[22] Filed: Dec. 28, 1971

[21] Appl. No.: 213,216

[30] Foreign Application Priority Data
Dec. 28, 1970  Japan .............................. 45-128858

[52] U.S. Cl. .............................................. 260/403
[51] Int. Cl. ............................ A23j 7/00, C07f 9/02
[58] Field of Search ................................... 260/403

[56] References Cited
UNITED STATES PATENTS

| | | | |
|---|---|---|---|
| 3,224,883 | 12/1964 | Pader et al. | 260/403 |
| 3,423,440 | 1/1969 | Cawley et al. | 260/403 |
| 3,542,820 | 11/1970 | Rakhit et al. | 260/403 |
| 3,577,446 | 5/1971 | Rakhit | 260/403 |

*Primary Examiner*—Elbert L. Roberts
*Attorney, Agent, or Firm*—Oblon, Fisher, Spivak, McClelland & Maier

[57] ABSTRACT

Phosphoric acid esters of fatty acid mono- or di-glyceride are prepared by reacting a fatty acid mono- or di-glyceride with phosphorylating amounts of polyphosphoric acids.

4 Claims, No Drawings

3,875,196

PROCESS FOR PREPARING PHOSPHORIC ACID ESTERS OF FATTY ACID MONO- OR DI-GLYCERIDES

BACKGROUND OF THE INVENTION

1. Field Of The Invention

This invention relates to a process for producing monophosphoric acid esters or mono-alkali metal phosphoric acid esters of fatty acid glycerides by phosphorylation of fatty acid mono- or di-glycerides.

2. Description Of The Prior Art

Many uses have been found for phosphoric acid esters and ester salts of fatty acid mono- and di-glycerides, particularly for those applications in which frothing, wetting, penetrating, detergent, emulsifying, or other interface modifying functions are required.

Phosphorylation of fatty acid mono-glycerides or di-glycerides is sufficiently different from that of other types of alcohols, such as the higher alkyl alcohols, due to their lability to both acidic and basic medium so that the ordinary criteria which are ordinarily applicable to such types of alcohol phosphorylation reactions are inapplicable to phosphorylation of the mono- or di-glycerides.

Four different techniques have been suggested in the prior art to carry out this type of phosphorylation reaction. However, none of these prior art techniques have proven to be entirely satisfactory from the point of view of industrial acceptability. For instance, in one type of procedure, a mono-glyceride, dissolved in a chloroform solution, is reacted with phosphorous oxychloride in the presence of quinoline as a catalyst (Kabashima Chem. Ber., 71, 1073 (1938)). In related experiments (U.S. Pat. Nos. 2,026,785 and 2,177,983), the phosphorylation is carried out in an acetone solution in the presence of pyridine. Neither of these variations, however, are acceptable industrially because of the difficulty in separating the organic solvents or the tertiary amines from the products and because the resulting products are generally characterized by an unpleasant odor. Moreover, the esters prepared in this fashion cannot be used for food products because of their high toxicity, and these reactions result in rather low yields (usually around 38%).

In a second type of reaction, phosphorylation of fatty acid mono-glycerides or di-glycerides is carried out with phosphorus pentoxide (U.S. Pat. Nos. 2,026,785 and 2,177,983, and Japanese Patent Publication No. 14322/'68). This reaction is rather complex, however, and therefore is generally undesirable for industrial use.

In a third type of process, the subject phosphoric acid esters are prepared by an addition reaction of an anhydrous phosphoric acid or anhydrous polyphosphoric acid with a glycidyl ester of a hydrocarbyl carboxylic acid (British Patent No. 1,174,789).

In a fourth type of reaction, (Chem. Ber., 71, 1071, 1073 and 1505 (1938), and German Pat. 719,830), glycerophosphoric acid is acylated with acyl chloride in the presence of a tertiary amine.

The third and fourth type reactions, however, are not industrially desirable because they require the use of organic solvents and catalysts in their reactions, and further because of the difficulty in obtaining the starting reactants.

It would be desirable, therefore, to provide a technique for the phosphorylation of fatty acid mono- or di-glycerides in high yields without the difficulties attendant in the prior art methods.

SUMMARY OF THE INVENTION

Accordingly, it is one object of this invention to provide a technique for the phosphorylation of fatty acid mono- or di-glycerides in high yields, in a simple reaction which will not result in severe separation problems or in a product having high toxicity or an objectionable odor.

It has now been found that phosphoric acid esters of fatty acid mono- or di-glycerides can be produced in very good yields by reacting a fatty acid mono- or di-glyceride with a polyphosphoric acid prepared by heating commercial phosphoric acid, or by heating commercial phosphoric acid with phosphorus pentoxide.

DETAILED DESCRIPTION OF PREFERRED EMBODIMENTS

The fatty acid mono- or di-glycerides may be produced by processing oils and fats of various animals and plants, or by acylating glycerine. The phosphorylation process may be carried out by either reacting the glyceride directly with a phosphorylating agent, or by reacting the glyceride in a solvent solution with a solution of a suitable phosphorylating agent at low temperatures or while heating.

The suitable phosphorylating agents used in the present invention are the (polyphosphoric acids, which have been prepared by heating commercial grade 85 percent phosphoric acid, or by heating commercial grade phosphoric acid and phosphorus pentoxide, at a temperature of between $-20°$ and $400°C$. under atmospheric or a reduced pressure.

The reaction is carried out at a temperature of between $-20°$ and $150°C$., and favorably between $50°$ and $100°C$., when a solvent is not used in the system.

In order to recover the glyceride phosphoric acid esters from the reaction mixture, the mixture is poured into cold water and the precipitated crystals are separated by filtration. Alternatively, the desired compounds are extracted with an organic solvent, such as chloroform, carbon tetrachloride, dichloroethane, ethylene dichloride, ether, hexane, etc.

If desired, for ease of handling and use, the product of this invention can be obtained in the form of a mono-alkali metal salt formed by neutralizing the glyceride ester or the extract solution. An organic solvent, such as acetone, methanol, ethanol etc. is then added to this mixture in order to precipitate crude crystals of monoalkali metal phosphoric acid esters of glycerides. These crude crystals can then be easily refined by recrystallization.

Having now generally described the invention, a further understanding can be attained by reference to certain specific Examples which are provided herein for purposes of illustration only and are not intended to be limiting unless otherwise specified.

EXAMPLE 1

50 milliliters of commercial grade 85 percent phosphoric acid were heated at 200°C. under 20 mmHg for 3 hours. To the heated phosphoric acid was added 50 grams of palmitic acid monoglyceride (purity:100%) at 20°C. This mixture was stirred at 80°C. for 2 hours, and then the reaction mixture was poured into 100 milliliters of cold water. The precipitated crystals were separated by filtration and dried. 59 g. of crude monophosphoric acid ester of palmitic acid monoglyceride was obtained.

The crystals obtained above were neutralized with 6 N aqueous sodium hydroxide solution. Acetone was added to this mixture and the precipitated crystals were separated by filtration.

By recrystallization from water-methanol (1 : 2) solution, 60.8 g. of pure mono-sodium phosphoric acid ester of palmitic acid mono-glyceride was obtained.

Yield: 93%, M.P. 220°–221°C.

Analysis: Calculated for $C_{19}H_{38}O_7PNa$ : C, 52.77; H, 8.88; P, 7.16; Na, 5.32. Found: C, 52,40; H, 9.15; P, 6.92; Na, 5.21.

Infrared absorption spectra: $\nu$max: 1110 (P - O), 1240 (P = O), 1735 (C = O of ester)cm$^{-1}$.

EXAMPLE 2

30 milliliters of commercial grade 85% phosphoric acid were heated at 200°C. for one-half hour while stirring. To the heated phosphoric acid was added 50 grams of commercial stearic acid mono-glyceride (fatty acids composition: myristic acid, 4%; palmitic acid: 30%; palmitoleic acid, 3%; stearic acid, 63%) at 20°C. This mixture was stirred at 90°C. for 1 hour and then poured into 100 milliliters of cold water. The resulting precipitate was extracted for phosphoric acid ester of stearic acid mono-glyceride with 500 milliliters of chloroform. The organic layer was neutralized with 6N aqueous sodium hydroxide solution and the chloroform layer was separated and the chloroform evaporated under reduced pressure. Acetone was added to the residue and the resulting precipitate was filtered off. By recrystallization from chloroform-acetone (1 : 1) solution, 58 g. of mono-sodium phosphoric acid ester of stearic acid mono-glyceride was obtained.

EXAMPLE 3

A mixture of 50 milliliters of commercial grade phosphoric acid and 30 grams of phosphorus pentoxide was heated to form a homogeneous solution. 60 grams of palmitic acid monoglyceride were added to this mixture and stirred at 80°C. for 1 hour. The reaction mixture was poured into 120 milliliters of cold water. The resulting precipitate was separated by filtration and then neutralized with 6N aqueous sodium hydroxide solution. Acetone was added to this solution and the resulting precipitate was separated by filtration. By recrystallization from chloroform-acetone (1 : 1) solution, 77 g. of mono-sodium phosphoric acid ester of palmitic acid monoglyceride was obtained.

Yield: 98%, M.P. 220°–221°C.

EXAMPLE 4

A mixture of 85 milliliters of commercial grade phosphoric acid and 30 grams of phosphorus pentoxide was stirred for 1 hour. 80 grams of commercial stearic acid monoglyceride were added to the mixture and then stirred at 80°C. for 1 hour. The reaction mixture was poured into 160 milliliters of cold water. The resulting precipitate was separated by filtration and then neutralized with 6N aqueous sodium hydroxide solution. Acetone was added to this solution, and the resulting precipitate was separated by filtration. By recrystallization from chloroform-acetone (1 : 1) solution, 93 g. of mono-sodium phosphoric acid ester of stearic acid monoglyceride was obtained.

EXAMPLE 5

20 milliliters of commercial grade phosphoric acid were heated at 200°C. under 40 mmHg for 3 hours. To the heated phosphoric acid was added 20 grams of stearic acid diglyceride at 20°C. This mixture was stirred at 80°C. for 2 hours. The reaction mixture was poured into 50 milliliters of cold water. The resulting precipitate was separated by filtration and then neutralized with 6N aqueous sodium hydroxide solution. Acetone was added to this solution and the resulting precipitate was separated by filtration. By recrystallization from chloroformacetone solution, 21 g. of mono-sodium phosphoric acid ester of stearic acid diglyceride was obtained.

Yield: 90%, Purity: 95%

Having now fully described the invention, it will be apparent to one of ordinary skill in the art that many changes and modifications can be made thereto without departing from the spirit or scope of the invention. ACCORDINGLY,

What is claimed as new and desired to be secured by Letters Patent is:

1. A process for producing phosphoric acid esters of fatty acid mono- or diglycerides which comprises reacting a mono- or diglyceride ester of stearic acid, myristic acid, palmitic acid, palmitoleic acid or a mixed acid ester thereof with a polyphosphoric acid.

2. The process of claim 1, wherein said phosphoric acid esters of fatty acid mono- or di-glycerides are obtained in the form of their corresponding mono-alkali metal salts.

3. The process of claim 1, wherein said polyphosphoric acids are prepared by heating phosphoric acid.

4. The process of claim 1, wherein said polyphosphoric acids are prepared by heat treating phosphoric acid with phosphorous pentoxide.

* * * * *